United States Patent
Tsukamoto et al.

(10) Patent No.: US 9,230,080 B2
(45) Date of Patent: Jan. 5, 2016

(54) METHOD OF STARTING A COMPUTER USING A BIOMETRIC AUTHENTICATION DEVICE

(71) Applicant: LENOVO (Singapore) PTE, LTD., New Tech Park (SG)

(72) Inventors: Yasumichi Tsukamoto, Yamato (JP); Mikio Hagiwara, Machida (JP); Naoyuki Araki, Yokohama (JP)

(73) Assignee: Lenovo (Singapore) PTE. LTD., Tech Park (SG)

( * ) Notice: Subject to any disclaimer, the term of this patent is extended or adjusted under 35 U.S.C. 154(b) by 486 days.

(21) Appl. No.: 13/683,617

(22) Filed: Nov. 21, 2012

(65) Prior Publication Data
US 2013/0159690 A1 Jun. 20, 2013

(30) Foreign Application Priority Data
Dec. 19, 2011 (JP) .................................. 2011-277260

(51) Int. Cl.
| G06F 21/32 | (2013.01) |
|---|---|
| G06F 1/26 | (2006.01) |
| G06F 9/44 | (2006.01) |
| G06F 21/57 | (2013.01) |
| G06F 1/32 | (2006.01) |

(52) U.S. Cl.
CPC ... *G06F 21/32* (2013.01); *G06F 1/26* (2013.01); *G06F 1/3234* (2013.01); *G06F 9/4401* (2013.01); *G06F 21/575* (2013.01)

(58) Field of Classification Search
CPC ...... G06F 21/32; G06F 21/575; G06F 9/4401
See application file for complete search history.

(56) References Cited

U.S. PATENT DOCUMENTS

| 7,213,139 | B2 | 5/2007 | Zhang |
| 8,254,568 | B2* | 8/2012 | Smith et al. ..................... 380/28 |
| 8,510,543 | B1* | 8/2013 | Shankar et al. .................. 713/2 |
| 8,810,367 | B2* | 8/2014 | Mullins ........................ 340/5.83 |
| 2008/0168275 | A1* | 7/2008 | De Atley et al. ............... 713/189 |
| 2009/0327744 | A1* | 12/2009 | Hatano ......................... 713/186 |
| 2010/0153752 | A1* | 6/2010 | Tsukamoto et al. .......... 713/300 |

FOREIGN PATENT DOCUMENTS

| CN | 1971471 | 5/2007 |
| CN | 101075281 | 11/2007 |
| JP | 2002-222022 | 8/2002 |
| JP | 2007-148979 | 6/2007 |
| JP | 2007-304646 | 11/2007 |
| JP | 2010-123125 | 6/2010 |
| JP | 2010-146048 | 7/2010 |
| JP | 2011-129041 | 6/2011 |

* cited by examiner

*Primary Examiner* — Mohammed Rehman
*Assistant Examiner* — Alyaa T Mazyad
(74) *Attorney, Agent, or Firm* — Kunzler Law Group

(57) ABSTRACT

A computer is made usable in a short time using a fingerprint authentication device. When a fingerprint authentication device performs authentication successfully, the fingerprint authentication device sends a startup signal to a power controller via a line. The power controller controls a DC/DC converter to supply power to devices. The fingerprint authentication device sets whether normal boot or fast boot that is completed in a shorter time than the normal boot is successful, in a register via a line. In the fast boot, initialization of a USB interface of a line and password input by a user are skipped, and a BIOS accesses a system by single sign-on using a password stored in a secure area.

23 Claims, 12 Drawing Sheets

| POWER STATE / POWER SYSTEM | S0 | S3 | S4 | S5(AC) | S5(DC) |
|---|---|---|---|---|---|
| VCC1 SYSTEM | | | | | |
| VCC2 SYSTEM | | | | | |
| VCC3 SYSTEM | | | | | |
| VCC4 SYSTEM | | | | | |

FIG. 2

| TRANSITION STATE | POWER BUTTON | FINGERPRINT AUTHENTICATION DEVICE | WOL | Fn KEY | |
|---|---|---|---|---|---|
| S3 S0 | | | | | WARM START |
| S4 S0 | (PP BIT) | (PP BIT) | | | COLD START |
| S5 S0 | (PP BIT) | (PP BIT) | | | |
| | | | * | * | NORMAL BOOT |
| | | | | * | FAST BOOT |

FIG. 7

METHOD OF STARTING A COMPUTER USING A BIOMETRIC AUTHENTICATION DEVICE

CROSS-REFERENCE TO RELATED APPLICATIONS

This application is a national patent application and claims priority to Japanese Patent Application Number 2011-277260 entitled "METHOD OF STARTING COMPUTER USING BIOMETRIC AUTHENTICATION DEVICE, AND COMPUTER" and filed on 19 Dec. 2011 for Yasumichi Tsukamoto, et al., which is incorporated herein by reference.

FIELD

This invention relates to a technique of starting a computer using a biometric authentication device, and more particularly relates to a technique of starting a computer in a short time while ensuring security.

BACKGROUND

A computer is configured to first execute BIOS code stored in a BIOS_ROM when powered on or reset. The BIOS code includes Power-On Self-Test ("POST") code for detecting, checking, and initializing devices installed in the computer. When the POST ends, an operating system ("OS"), an application program, and the like, is loaded into a main memory, making the computer usable. A sequence of startup processes of the computer from when the computer is powered on to when the computer becomes usable is referred to as boot or bootstrap. A shortest possible boot time is desirable in view of user convenience.

Patent documents 1 and 2 each disclose an invention that omits the POST for some of the devices to reduce the boot time. To ensure computer security, after the startup, the user is requested by the BIOS to input a power-on password, a supervisor password, and a hard disk ("HDD") password. Further, the user is requested by the OS to input a login password. When the user inputs a plurality of passwords each time he/she is requested by the computer, a longer time is taken to make the computer usable, which indirectly causes a longer boot time.

The invention of patent document 3 transferred to the applicant of the present invention relates to an authentication method by single sign-on ("SSO") in which the power of the computer is started when a fingerprint authentication device authenticates the user, and the fingerprint authentication device inputs a plurality of passwords instead of the user. In the invention of patent document 3, binding data, a fingerprint ownership key, and a plurality of passwords substituting for passwords input by the user are stored in the fingerprint authentication device. When the fingerprint authentication is successful, the computer is started and the POST is executed.

In the POST, CRTM authentication code stored in the BIOS_ROM exchanges the binding data and the fingerprint ownership key bi-directionally between the fingerprint authentication device and a security chip, to ensure the fingerprint authentication device and the security chip are both trustable. Moreover, the password authentication code stored in the BIOS_ROM compares the plurality of passwords acquired from the fingerprint authentication device with a corresponding plurality of passwords registered in an NVRAM beforehand and, when the passwords match, permits access to the system, as a result of which the OS begins booting.

Patent document 4 discloses a single sign-on system in which processes leading up to login authentication of the OS are initiated by single input to the BIOS by the user. Upon detecting an input from pen input means when an EC/KBC is in a power saving mode, the BIOS starts the fingerprint authentication device and the OS to be in a usable state. When the fingerprint authentication is successful, the BIOS performs the authentication process by single sign-on.

Patent Document 1—U.S. Pat. No. 7,213,139
Patent Document 2—Japanese Unexamined Patent Publication No. 2010-123125
Patent Document 3—Japanese Unexamined Patent Publication No. 2010-146048
Patent Document 4—Japanese Unexamined Patent Publication No. 2007-148979

SUMMARY

In the single sign-on described in patent document 3, the password input can be omitted, so that only the fingerprint authentication needs to be performed to make the computer usable. This contributes to a shorter boot time. If simple POST excluding some devices as in the inventions of patent documents 1 and 2 can be applied to the invention of patent document 3, it is possible to complete the boot in an even shorter time.

USB is an interface used by many peripheral devices. Executing the POST on all USB peripheral devices implemented in the computer leads to a longer boot time. However, since the USB can also be initialized by the OS, the USB peripheral devices are eligible to be excluded from the simple POST in order to effectively reduce the boot time. Additionally, the USB supports plug-and-play and, therefore, is convenient as an interface for an external fingerprint authentication device. The common interface is desirable for an internally-mounted fingerprint authentication device. Hence, the fingerprint authentication device in patent document 3 employs the USB as an interface.

If the USB is excluded from the POST, the BIOS does not recognize the fingerprint authentication device in the invention of patent document 3. This hinders the single sign-on, as the mutual authentication between the fingerprint authentication device and the system cannot be performed and the passwords cannot be extracted from the fingerprint authentication device. Thus, even when the simple POST is applied to the invention of patent document 3, its advantageous effect is limited because the USB, which significantly contributes to the boot-time, cannot be excluded.

Moreover, in the case of excluding the USB from the simple POST, the user needs to input each password instead of the single sign-on, which makes it impossible to reduce the boot time. Even when the fingerprint authentication device is not authenticated by the BIOS executing the POST, the fingerprint authentication device can perform the fingerprint authentication, and the use of the fingerprint authentication result enables both the single sign-on using the fingerprint authentication device and the POST excluding the USB to be achieved. In this case, however, measures against tampering are necessary because the BIOS cannot authenticate the fingerprint authentication device when the USB interface is excluded from the POST.

In view of the above, the object of the present invention is to provide a computer startup method for making a computer usable in a short time using a biometric authentication device. The present invention also provides a startup method that achieves a reduction in boot time while ensuring security. The present invention further provides a computer and a computer program using such a startup method.

A computer according to the present invention is able to be started by a biometric authentication device. A power control circuit may start power of the computer in response to successful authentication by the biometric authentication device. A boot execution circuit may execute a normal boot when the computer is started by pressing a power button and execute a fast boot when the computer is started by the successful authentication by the biometric authentication device. The normal boot requires password input by a user whereas the fast boot uses a password stored in the computer to access a system without acquiring a password from the user.

The fast boot may be completed in a short time by omitting initialization of an interface of the biometric authentication device to the system. The boot execution circuit may complete boot of a BIOS to boot of an operating system without requesting the password input by the user when executing the fast boot. By combining the fast boot, in which the devices to be initialized are more limited than in the normal, with the password input omission, the boot time can be further reduced.

The boot execution circuit may authenticate the biometric authentication device using authentication data registered in a security chip when executing the normal boot by the pressing of the power button, and omit authenticating the biometric authentication device when executing the fast boot. Though there is a possibility that the security of the biometric authentication device cannot be ensured in the case of the fast boot, this can be solved by the following method.

In particular, in the case where the biometric authentication device is disconnected from the computer and then reconnected to the computer after previous boot, the power control circuit may prohibit the computer from being started by the biometric authentication device, and the boot execution circuit may request the password input by the user when the power button is pressed to execute the normal boot. Moreover, in the case where power of the power control circuit is stopped after previous boot, the power control circuit may prohibit the computer from being started by the biometric authentication device, and the boot execution circuit may request the password input by the user when the power button is pressed to execute the normal boot.

In the case where the biometric authentication device is disconnected from the computer and then reconnected to the computer after previous boot, the biometric authentication device may stop notifying the power control circuit whether or not authentication is successful until the notification is permitted by the boot execution circuit when the power button is pressed to execute the normal boot. The biometric authentication device may be a fingerprint authentication device that includes a USB interface. The fingerprint authentication device may authenticate a finger corresponding to the normal boot or a finger corresponding to the fast boot, and the boot execution circuit may execute the normal boot or the fast boot according to the authenticated finger.

According to the present invention, it is possible to provide a computer startup method for making a computer usable in a short time using a biometric authentication device. According to the present invention, it is also possible to provide a startup method that achieves a reduction in boot time while ensuring security. According to the present invention, it is further possible to provide a computer and a computer program using such a startup method.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 2 is a diagram for describing power systems of a DC/DC converter corresponding to each power state;

FIG. 7 is a diagram for describing a power state transition method of the laptop PC and its related operation;

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
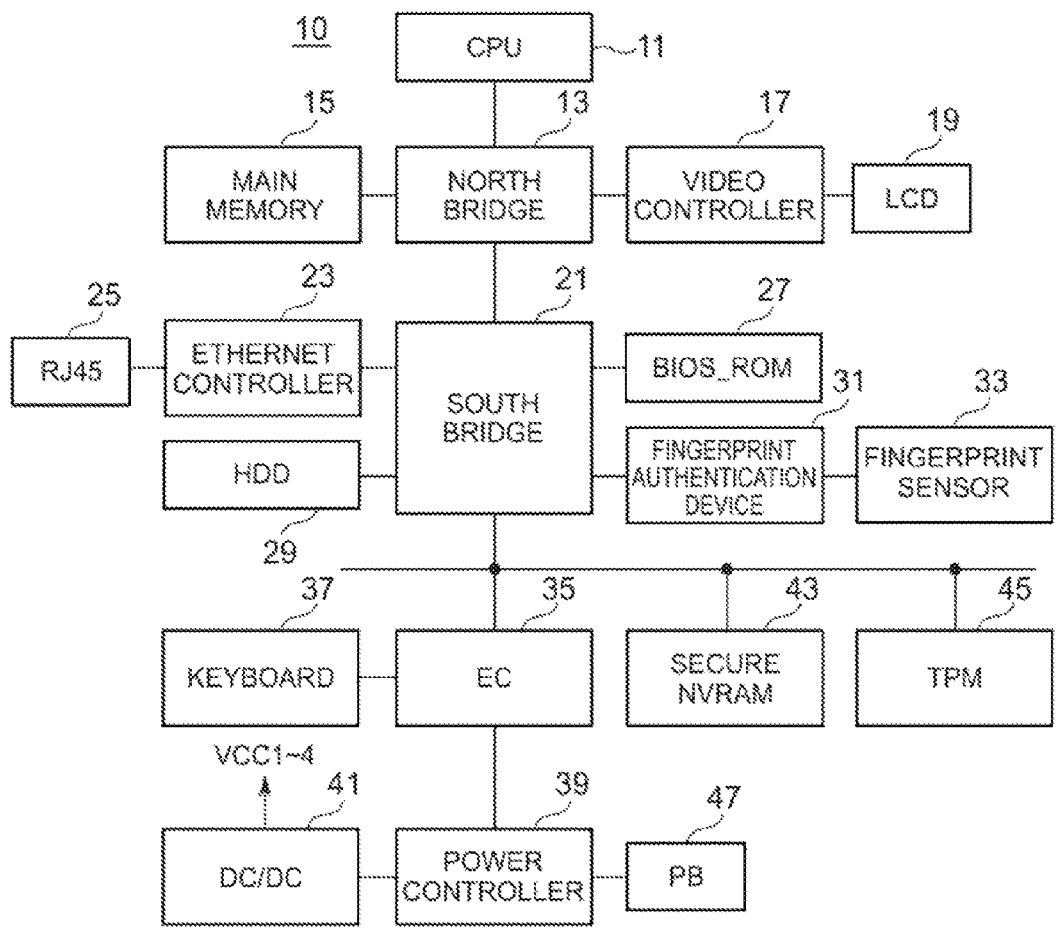
FIG. 1 is a schematic block diagram showing a structure of main hardware of a laptop PC.

FIG. 1 depicts a schematic block diagram showing a structure of main hardware of a laptop personal computer ("laptop PC") 10. Since many hardware components are known, the following description is made in the range necessary for the present invention. A CPU 11, a main memory 15, a video controller 17, and a southbridge 21 are connected to a northbridge 13. An LCD 19 is connected to the video controller 17. The southbridge 21 has interface functions of various standards. Typically, an Ethernet (registered trademark) controller 23 is connected to PCI Express, a hard disk drive ("HDD") 29 is connected to SATA, a BIOS_ROM 27 is connected to SPI, a fingerprint authentication device 31 is connected to USB, and an embedded controller ("EC") 35, a secure NVRAM 43, and a Trusted Platform Module ("TPM") 45 are connected to LPC in FIG. 1.

The Ethernet® controller 23 is an expansion card for connecting to an Ethernet® wired LAN, and is connected to a connector 25 of a standard called RJ45 attached to a housing of the laptop PC 10. In a predetermined power state, the laptop PC 10 receives a magic packet from the network via the Ethernet® controller 23, thereby being started by "Wake On LAN" ("WOL"). The HDD 29 stores an HDD password in a secure system area of the disk, and requests authentication of an HDD password received from BIOS before permitting access from the system. A swipe fingerprint sensor 33 for generating a fingerprint image of a user is connected to the fingerprint authentication device 31.

The EC 35 is a microcomputer composed of a CPU, a ROM, a RAM, and the like, and has a multi-channel A/D input terminal, a multi-channel D/A output terminal, a timer, and a digital input/output terminal. The EC 35 is capable of executing a program relating to management of an internal operating environment of the laptop PC 10, independently of the CPU 11. The EC 35 includes a keyboard controller, and a keyboard 37 and a power controller 39 are connected to the EC 35.

A DC/DC converter 41 is connected to the power controller 39. The power controller 39 is a wired-logic digital control circuit ("ASIC") for controlling the DC/DC converter 41 based on instructions from the EC 35. The DC/DC converter 41 converts a DC voltage supplied from an AC/DC adapter or battery pack not shown, to a plurality of voltages necessary for operating the laptop PC 10. The DC/DC converter 41 supplies power to each device based on power supply categories defined according to power states. A power button 47 for starting the laptop PC 10 is connected to the power controller 39. The power button 47 is attached so as to be physically integrated with the housing of the laptop PC 10, and can be pressed only by a user who physically controls the laptop PC 10.

The secure NVRAM 43 is a nonvolatile memory whose security against tampering or eavesdropping is ensured. The TPM 45 is a known security chip conforming to the Trusted Computing Group ("TCG") specification. The TPM 45 is connected to a motherboard of the laptop PC 10 by soldering to prevent relocation to another computer. Even when the TPM 45 is relocated to another computer, that computer is not operable. The TPM 45 has a validity verification function of verifying whether or not a platform is trustable and compliant with the TCG specification, an integrity function of checking if hardware or software is not tampered with, a cryptographic key protection function of keeping an internally stored cryptographic key from being taken outside, and various cryptographic processing functions.

The laptop PC 10 supports a power saving function according to the advanced configuration and power interface ("ACPI") and plug and play. ACPI defines five sleeping states. States S1 to S3 each have a reduced startup time. In the S1 state, data cached in the CPU 11 is lost, but system contexts are maintained. The S2 state is the same as the S1 state except that contexts of the CPU 11 and system caches are lost. In the S3 state, in addition to the S2 state, contexts of the northbridge 13 and the southbridge 21 are lost, but data stored in the main memory 15 is maintained. The S3 state is referred to as a suspended state or "Suspend to RAM." In the S3 state, the laptop PC 10 powers off devices other than the main memory 15, the southbridge 21, the EC 35, and the Ethernet® controller 23.

An S4 state is a state with the longest startup time among the power states supported by ACPI, and is referred to as "Suspend to Disk" or a hibernation state. When the laptop PC 10 transitions from a S0 state to the S4 state, an OS stores immediately previous contexts of the laptop PC 10 in the HDD 29 and then powers off devices other than the power controller 39 and minimum necessary devices for power startup. An S5 state is a power-off state referred to as "soft off." The range of devices supplied with power in the S5 state is the same as in the S4 state, except that the OS does not store the contexts in the HDD 29. When WOL is set, power is supplied to the Ethernet® controller 23 and the southbridge 21 not only in the S3 state but also in the S4 and S5 states, enabling startup by receiving a magic packet.

The S0 state is a power-on state in which power is supplied to devices necessary for the laptop PC to operate. FIG. 2 is a diagram for describing power systems of the DC/DC converter 41 corresponding to each power state. In the laptop PC 10, the S0 state, the S3 state, the S4 state, the S5 (AC) state, and the S5 (DC) state are defined. The S5 (AC) state means a power-off state in which the AC/DC adapter is connected, and the S5 (DC) state means a power-off state in which the AC/DC adapter is disconnected and the battery pack is attached.

In the following description, the S5 state includes both the S5 (AC) state and the S5 (DC) state, unless otherwise noted. In the S5 (DC) state, power is supplied to the minimum necessary devices for starting the power of the laptop PC 10, in order to minimize battery drain in the power-off state. Though the S1 and S2 states are not defined in FIG. 2, these states are treated in the same way as the S3 state in the present invention.

The DC/DC converter 41 is composed of four power systems from a VCC1 system to a VCC4 system. The VCC1 system supplies power only to minimum devices necessary for power startup, such as the power controller 39, which operates in every power state, the fingerprint authentication device 31 when operating in an idle mode, a lid sensor (not shown) for detecting an open state of the LCD 19, and the like. The VCC1 system is made of a linear regulator that has high efficiency in a low load condition.

The VCC2 system supplies power to the EC 35, the southbridge 21, and the like, which operate in each power state other than the S5 (DC) state. The VCC2 system also supplies power to the fingerprint authentication device 31 when operating in an authentication mode. The VCC3 system supplies power to the main memory 15, the northbridge 13, and the like which operate in the S0 and S3 states. The VCC4 system supplies power to the CPU 11, the LCD 19, the HDD 29, and the like, which operate in the S0 state. The EC 35 controls the DC/DC converter 41 via the power controller 39, to operate each necessary power system according to one of the power states defined in FIG. 2.

The laptop PC 10 can be started by two types of boot methods: normal boot and fast boot. Both boot types correspond to a startup routine, called cold start, which requires transitioning from the S4 or S5 state to the S0 state. The normal boot is an ordinary boot method in which almost all devices except devices that can be initialized by the OS without problem are subjected to the POST in the BIOS process. The fast boot method reduces the boot time by limiting the range of devices subjected to the POST, or omitting screen display, as compared with the normal boot.

A boot method can be characterized by a power startup method, possibly authenticating a physical presence, and a password input method. In the normal boot, power startup is initiated by any of pressing of the power button 47, WOL, and fingerprint authentication. In the fast boot, on the other hand, power startup is initiated only by fingerprint authentication. Physical presence authentication is performed in both boot methods, but, in the case of startup by the fingerprint authentication device, is intended to prevent tampering. The normal boot employs any of the password input methods that are individual input and single sign-on by fingerprint authentication, whereas the fast boot employs only the password input method of single sign-on by fingerprint authentication. Boot can be divided into a BIOS execution stage and an OS execution stage. The fast boot and the normal boot both correspond to the BIOS execution stage.

Figure 3:
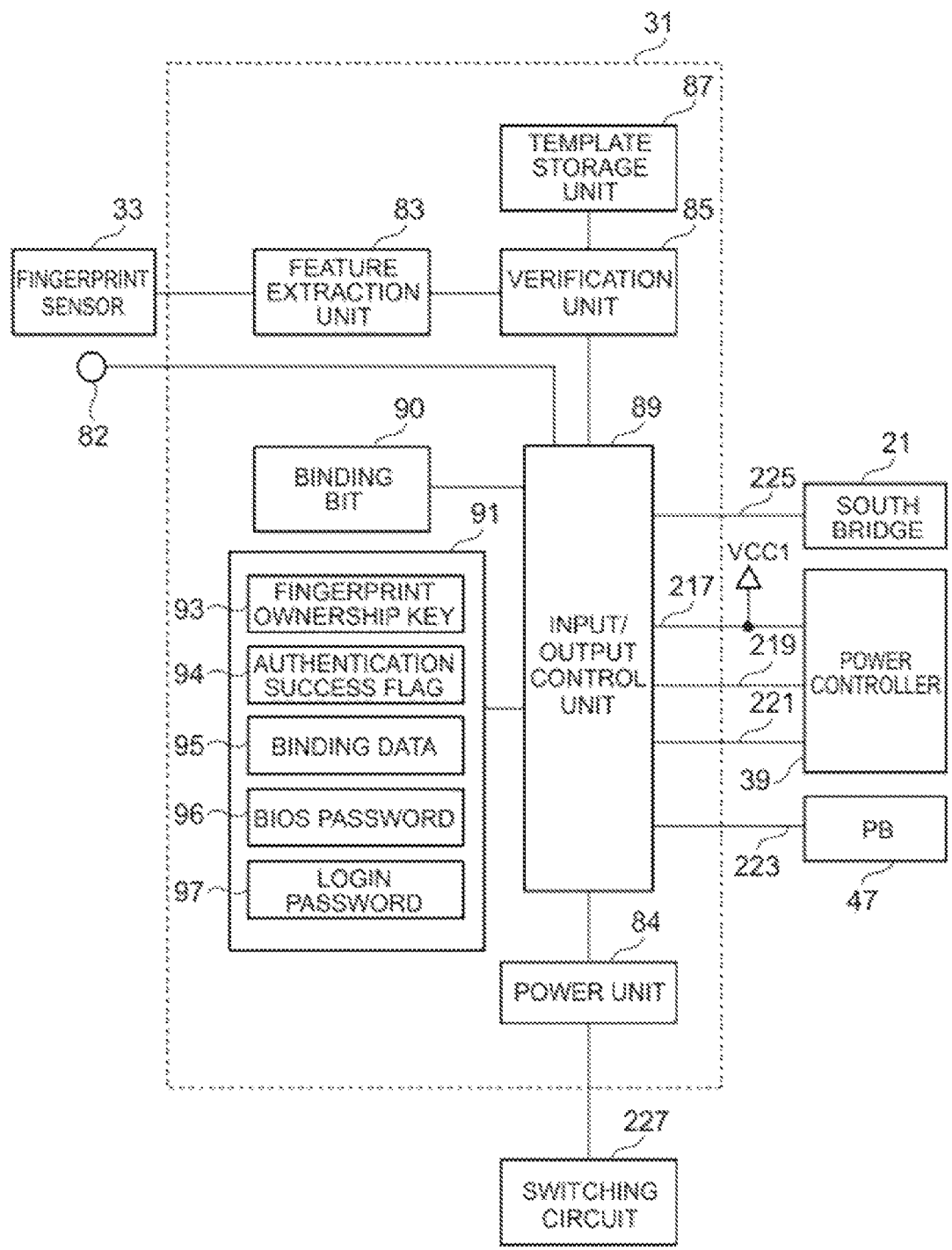
FIG. 3 is a block diagram showing a structure of a fingerprint authentication device.

FIG. 3 is a block diagram showing a structure of the fingerprint authentication device 31. The fingerprint authentication device 31 operates in the idle mode of operating while consuming minimum necessary power for detecting proximity of a finger, and the authentication mode of performing authentication by comparing verification fingerprint data with a template while consuming maximum power. The fingerprint authentication device 31 and the fingerprint sensor 33 are each attached so as to be physically integrated with the housing of the laptop PC 10. Note that the fingerprint authentication device 31 and the fingerprint sensor 33 need not necessarily be fixed to the housing, and may be placed in a range in which the user that directly controls the laptop PC 10 can perform authentication.

A feature extraction unit 83 extracts feature points from a fingerprint image received from the fingerprint sensor 33, and digitizes correlations of the extracted feature points to generate verification fingerprint data. The fingerprint sensor 33 is provided with a proximity sensor 82 for detecting placement of a finger on the fingerprint sensor 33 upon swipe by a change in electric field, capacitance, or the like. A template storage unit 87 stores the trustworthy user's verification fingerprint data, registered beforehand, as a template.

The verification fingerprint data can be registered for each boot type. For example, data of an index finger is registered in association with the fast boot, and data of a middle finger is registered in association with the normal boot. The verification fingerprint data is input from the fingerprint sensor 33 and registered when the laptop PC 10 is in the power-on state. A verification unit 85 compares the verification fingerprint data generated by the fingerprint sensor 33 and the feature extraction unit 83 with the template for authentication, and determines that the authentication is successful in the case where a match exceeds a predetermined score. The verification unit 85 sends data indicating the authentication result, and, in the case where the authentication is successful, data indicating whether the finger corresponding to the fast boot or the normal boot is successfully authenticated, to an input/output control unit 89.

Figure 4:
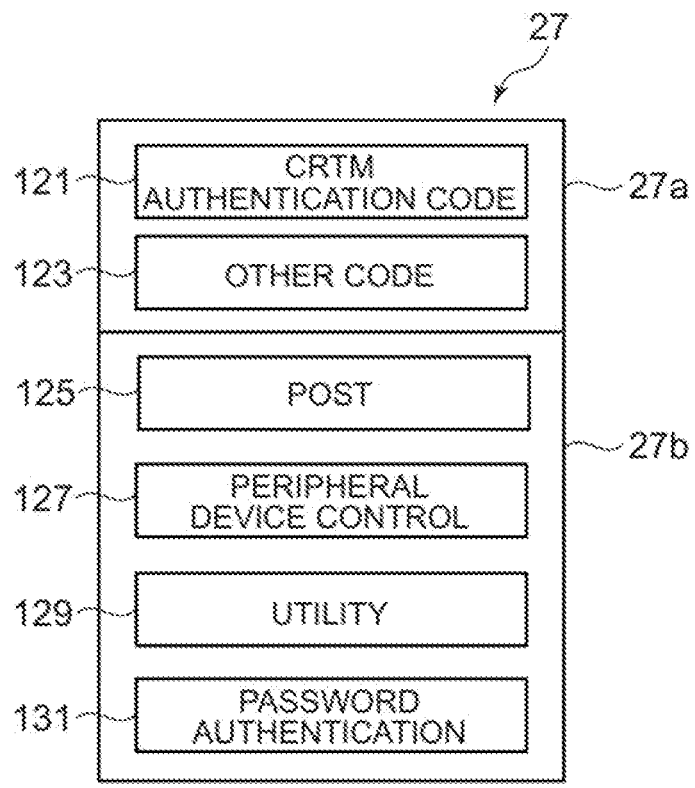
FIG. 4 is a diagram showing a structure of a BIOS_ROM.

A register 90 is a volatile memory that is set to a logic value 1 by password authentication code 131 when the core root of trust for measurement ("CRTM") authentication code 121, shown in FIG. 4, and the TPM 45 authenticate the fingerprint authentication device 31, in the case of the startup, by pressing the power button 47 to execute the normal boot. The register 90 is supplied with power from the VCC1 system. When the fingerprint authentication device 31 is disconnected from the laptop PC 10 and then reconnected to the laptop PC 10, when the fingerprint authentication device 31 is newly connected to the laptop PC 10, or when the power of the VCC1 system is stopped, there is a possibility of tampering with the fingerprint authentication device 31. In such a situation, the binding bit is set to a logic value 0. A data storage unit 91 is a secure nonvolatile memory for storing a fingerprint ownership key 93, an authentication success flag 94, binding data 95, a BIOS password 96, and a login password 97.

The fingerprint ownership key 93 is data associated with the template of the registered user, and is used for the fingerprint authentication device 31 to authenticate the TPM 45. The authentication success flag 94 is set by the input/output control unit 89 when the verification unit 85 determines that the template 87 and the verification fingerprint data match for any of the fingers. The binding data 95 is data associated with the template of the registered user, and is used for the TPM 45 to authenticate the fingerprint authentication device 31. The BIOS password 96 is made up of a power-on password, a supervisor password, and an HDD password. The power-on password is a password requested by the BIOS when starting the laptop PC 10. The supervisor password is a password requested by the BIOS when changing the settings of the BIOS. The HDD password is a password requested by the BIOS for accessing the HDD 29.

The login password 97 is a password requested by the OS for logging in to the OS. When the user inputs the BIOS password 96 or the login password 97 from the keyboard 37 to set the password in the laptop PC 10, the password authentication code 131 or an authentication module of the OS registers a hash value of the input password in the data storage unit 91.

The BIOS password 96 and the login password 97 registered in the data storage unit 91 are used for single sign-on in the normal boot through the startup by the fingerprint authentication device 31, but are not used for single sign-on in the fast boot. To rewrite the data stored in the data storage unit 91, the authentication by the fingerprint authentication device 31 or the supervisor password input from the keyboard 37 needs to be performed before the OS begins booting.

The input/output control unit 89 has a USB interface, and is connected to a USB port of the southbridge 21 by a line 225 to transfer data with the system. The line 225 may be referred to as a software communication circuit because it is used by the CPU 11 executing a program. The communication with the southbridge 21 is enabled after the USB interface of the input/output control unit 89 is initialized and recognized by the BIOS or the OS. The input/output control unit 89 is also capable of accessing the data storage unit 91.

The input/output control unit 89 maintains a potential of a line 217 to a ground level during voltage application by the VCC1 system. The potential of the line 217 increases to the voltage of the VCC1 system when the fingerprint authentication device 31 is disconnected from the laptop PC 10. By detecting this change in potential, the power controller 39 can detect the disconnection of the fingerprint authentication device 31.

When the proximity sensor 82 detects the proximity of a finger while operating in the idle mode, the input/output control unit 89 sends a signal to switch the power source from the VCC1 system to the VCC2 system and then to the power controller 39 via a line 219, in order to operate in the authentication mode. When the verification unit 85 authenticates the finger registered for the fast boot, the input/output control unit 89 outputs a logic value "01" to the power controller 39 via a line 221. When the verification unit 85 authenticates the finger registered for the normal boot, the input/output control unit 89 outputs a logic value "11" to the power controller 39 via the line 221. When the verification unit 85 fails the authentication, the input/output control unit 89 does not output any of the logic values.

In the case where the fingerprint authentication of any finger is successful, the input/output control unit 89 sends a pseudo startup signal equivalent to a startup signal generated when the power button 47 is pressed, to the power button 47 via a line 223. The lines 219, 221, and 223 may be referred to as a hardware communication circuit because they can be used even before the initialization of the USB interface ends and the system recognizes the USB interface. When the binding bit is not set in the register 90, the input/output control unit 89 does not output any signal to the power button 47, the southbridge 21, or the power controller 39 even if the authentication is successful. A power unit 84 receives power from a switching circuit 227, and supplies power to the fingerprint authentication device 31, the fingerprint sensor 33, and the proximity sensor 82.

FIG. 4 is a diagram showing a structure of the BIOS_ROM 27. The BIOS_ROM 27 is a nonvolatile memory which is electrically rewritable, and employs a boot block method in order to reduce any risk associated with rewriting. The BIOS_ROM 27 has a storage area composed of a boot block 27*a* and a system block 27*b*. The boot block 27*a* is a write-protected storage area where the stored code is treated as CRTM defined in the TPM specification and is not rewritable without a special privilege.

The CRTM is configured as a consistent part of initialization code of a platform, and needs to be executed first upon resetting the platform. The CRTM is executed first during cold boot in which the laptop PC 10 transitions from the S4 or S5 state to the S0 state. All consistency measurements for the platform of the laptop PC 10 are carried out based on the CRTM. The CRTM is executed to authenticate the TCG-defined physical presence by a command method.

In the boot block 27*a*, the CRTM authentication code 121 for authenticating the physical presence and minimum other code 123 are stored as the CRTM. The other code 123 includes functions of detecting, testing, and initializing minimum necessary hardware for authenticating the physical presence, such as the CPU 11, the main memory 15, the southbridge 21, the fingerprint authentication device 31, the TPM 45, and the like. The other code 123 also includes functions necessary for rewriting the BIOS_ROM 27. The system block 27*b* stores code for BIOS functions that are not executed by the other code 123. The consistency of the code stored in the system block 27*b* is calculated based on the CRTM stored in the boot block 27*a*.

Power-On Self-Test ("POST") code 125 detects, tests, and initializes devices subjected to the fast boot and the normal boot. Peripheral device control code 127 controls input and/or output for accessing the LCD 19, the HDD 29, the keyboard 37, and the like under control of the BIOS. A utility 129 manages a temperature in the housing, the power supply, and so on. The password authentication code 131 authenticates the BIOS password. The password authentication code 131 also performs a process for the user to set whether or not to validate authentication of physical ownership presence, perform authentication by single sign-on, and the like.

Figure 5:
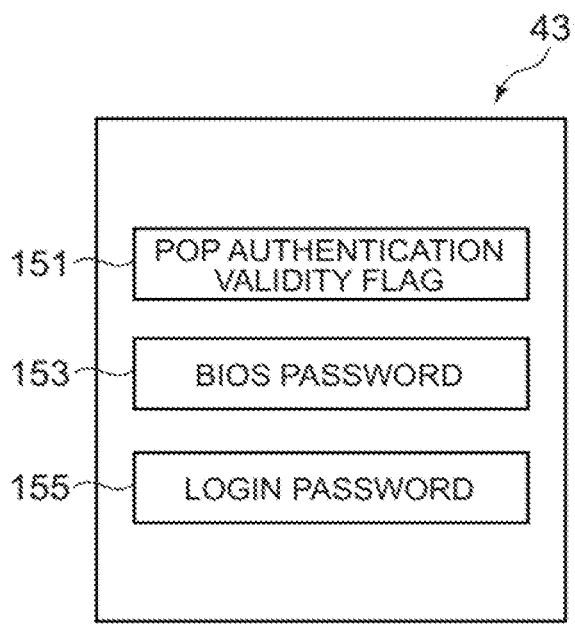
FIG. 5 is a diagram showing a structure of a secure NVRAM.

FIG. 5 is a diagram showing a structure of the secure NVRAM 43. The secure NVRAM 43 is a nonvolatile memory in which access is restricted under the environment of the OS, and can be accessed only by code whose consistency is guaranteed by the CRTM through supervisor password input. The secure NVRAM 43 stores a POP authentication validity flag 151, indicating that the user validates physical ownership presence authentication, and a BIOS password 153. The POP authentication validity flag 151 is set by the password authentication code 131 in an initial stage after the laptop PC 10 is started, based on the selection result of the user as to whether to perform physical ownership presence authentication according to the present invention or conventional physical presence authentication.

The BIOS password 153 is made up of a power-on password, a supervisor password, and an HDD password. The password authentication code 131 registers a BIOS password input by the user from the keyboard 37 in order to set the password in the laptop PC 10, in the secure NVRAM 43. The password authentication code 131 compares hash values of the BIOS password 96 received from the fingerprint authentication device 31 and the BIOS password 153 registered in the secure NVRAM 43 and, when they match, permits access to the system.

Figure 6:
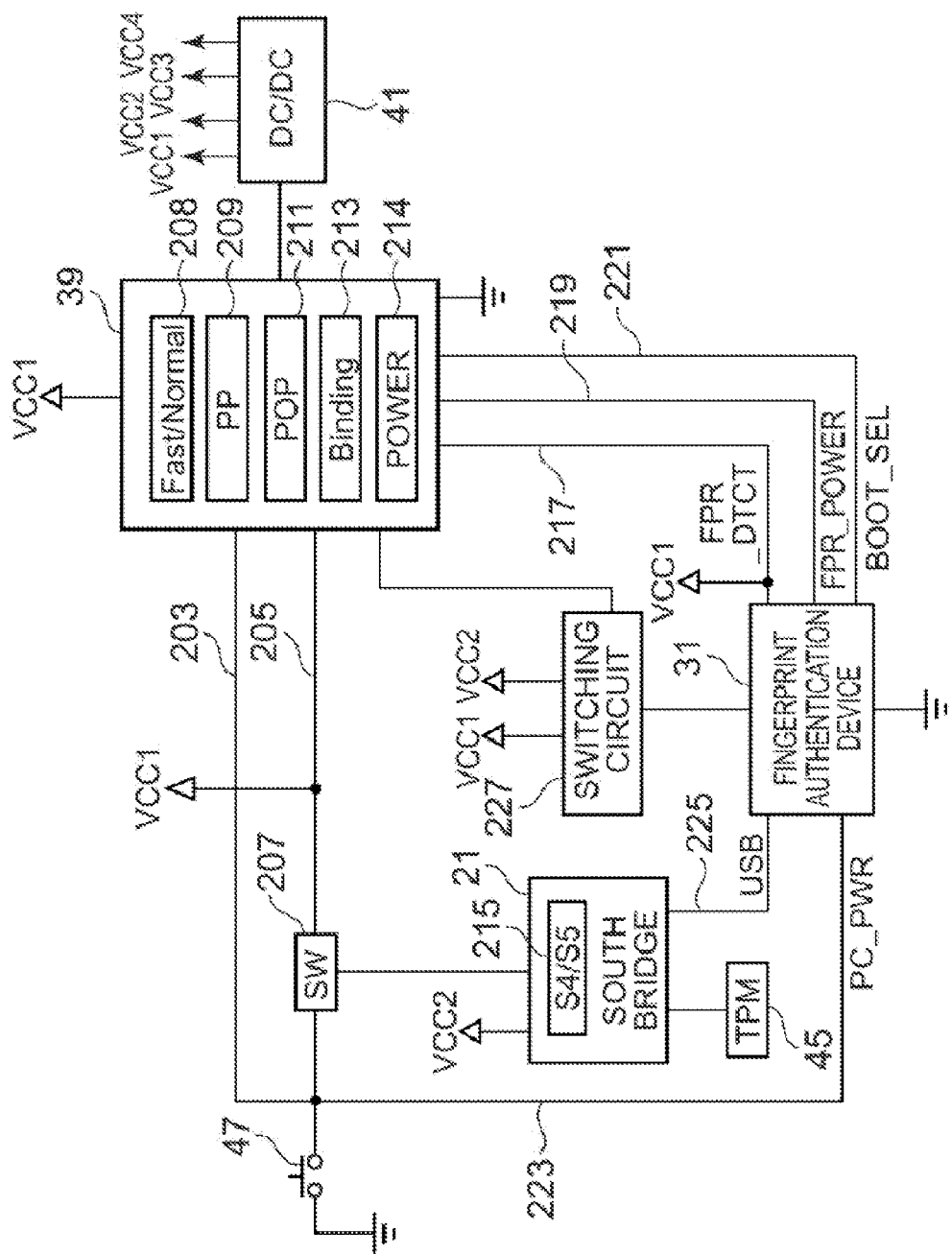
FIG. 6 is a functional block diagram showing a structure of hardware relating to startup and authentication of the laptop PC.

FIG. 6 is a functional block diagram showing a structure of hardware relating to boot and authentication of the laptop PC 10. The power button 47 is connected to the power controller 39 by a startup signal line 203. The user presses the power button 47, to send the startup signal to the power controller 39 via the startup signal line 203. The power button 47 is also connected to one terminal of a switch 207. Another terminal of the switch 207 is connected to the power controller 39 by a PP bit setting line 205.

The power controller 39 includes a register 208 for setting a boot bit, a register 209 for setting a Physical Presence ("PP") bit, a register 211 for setting a Physical Ownership Presence ("POP") bit, a register 213 for setting a binding bit, and a register 214 for setting a power bit. The register 208 indicates the fast boot when the logic value "01" is set by the fingerprint authentication device 31 and the normal boot when the logic value "11" is set by the fingerprint authentication device 31. When the fingerprint authentication device 31 does not set any logic value, the register 208 maintains a logic value "00" to indicate that fingerprint authentication fails or is not performed. The logic value "00" indicates the normal boot.

The register 209 is set by the startup signal generated by the pressing of the power button 47 or the pseudo startup signal generated by the authentication of the fingerprint authentication device 31, in the cold start. The PP bit is data for asserting the physical presence to the CRTM authentication code 121. The register 211 is set to the logic value "1" by the CRTM authentication code 121 in order to assert the physical presence when the PP bit is set under a condition of the POP authentication validity flag 151 being set and also the mutual authentication between the fingerprint authentication device 31 and the TPM 45 is successful.

The register 213 is set to the logic value "1" by the power controller 39 upon detecting a rising edge of the potential of the line 217 that increases when the fingerprint authentication device 31 is disconnected from the laptop PC 10. The register 214 is set to the logic value "1" by the password authentication code 131 when performing the normal boot by pressing the power button 47. The bits set in the registers 208, 209, 211, 213, and 214 are cleared and set to the logic value "0" when the VCC1 system, which is the power source of the power controller 39, is stopped. Upon receiving the startup signal via the startup signal line 203 when the laptop PC 10 is in the S3, S4, or S5 state, the power controller 39 controls the DC/DC converter 41 to supply power to each device in a predetermined sequence so as to transition to the S0 state.

The southbridge 21 includes a nonvolatile register 215. In the case of causing a transition of the power state of the laptop PC 10, power control software sets a bit indicating a transition destination power state and a bit indicating transition execution, in the register 215. When the laptop PC 10 transitions to the power-on state, the southbridge 21 determines a transition source power state by referencing to the register 215, and controls the power controller 39 via the EC 35.

A control terminal of the switch 207 is connected to the southbridge 21. The southbridge 21 references to the value of the register 215, and turns on the switch 207 when the transition source power state is the S4 or S5 state and turns off the switch 207 when the transition source power state is the S3 state. When the switch 207 is on, the startup signal sent by the pressing of the power button 47, or the pseudo startup signal sent by the authentication of the fingerprint authentication device 31, sets the PP bit in the register 209 via the PP bit setting line 205.

The switching circuit 227 is connected to the power controller 39, the DC/DC converter 41, and the fingerprint authentication device 31. The DC/DC converter 41 is connected to the switching circuit 227 in the VCC1 system and the VCC2 system. The switching circuit 227 switches between the VCC1 system and the VCC2 system without instantaneous interruption according to a control signal of the power controller 39, and supplies power to the fingerprint authentication device 31 from one of the power systems.

FIG. 7 is a diagram for describing a method of transitioning from each power state to power-on in the laptop PC 10 and its related operation. FIG. 7 shows a method of transitioning from each of the S3 to S5 states to the S0 state. The startup initiated by the pressing of the power button 47, and the startup initiated by the authentication of the fingerprint authentication device 31, can be executed from any power state. The startup initiated by the WOL can be executed except for the transition from the S5 state. The startup initiated by the pressing of a function key of the keyboard 37 can be executed except for the transition from the S4 or S5 state.

The CRTM authentication code 121 and the other code 123 in the boot block 27a are executed before the OS begins booting, only when transitioning from the S4 or S5 state to the S0 state. Transitioning from the S4 or S5 state to the S0 state is referred to as a cold start or cold boot, whereas transitioning from a power state other than the S4 or S5 state to the S0 state is referred to as a warm start or warm boot.

When the power button 47 is pressed or the fingerprint authentication device 31 performs authentication to execute the cold start, the PP bit for authenticating the physical presence is set in the register 209 via the bit setting line 205. The normal boot and the fast boot each correspond to the cold start mode. In the warm start, contexts of many devices are held in the main memory, so that the laptop PC 10 becomes usable in a shorter time than in the fast boot. The normal boot is executed by the pressing of the power button 47, the authentication of the fingerprint authentication device 31, or the WOL, whereas the fast boot is executed only by the authentication of the fingerprint authentication device 31.

Figure 8:
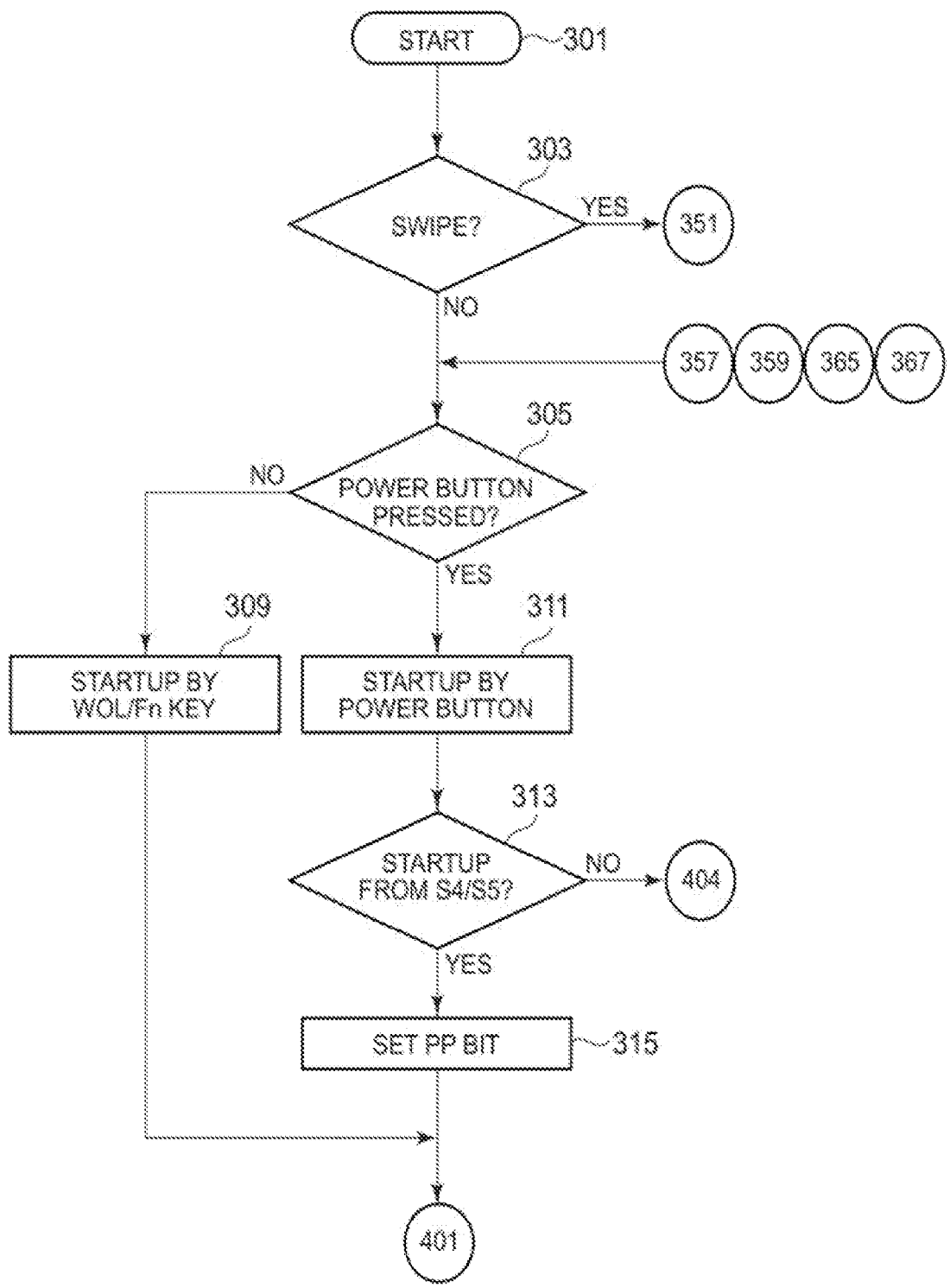
FIG. 8 is a flowchart showing a procedure from when a power button is pressed to when a PP bit is set.
Figure 9:
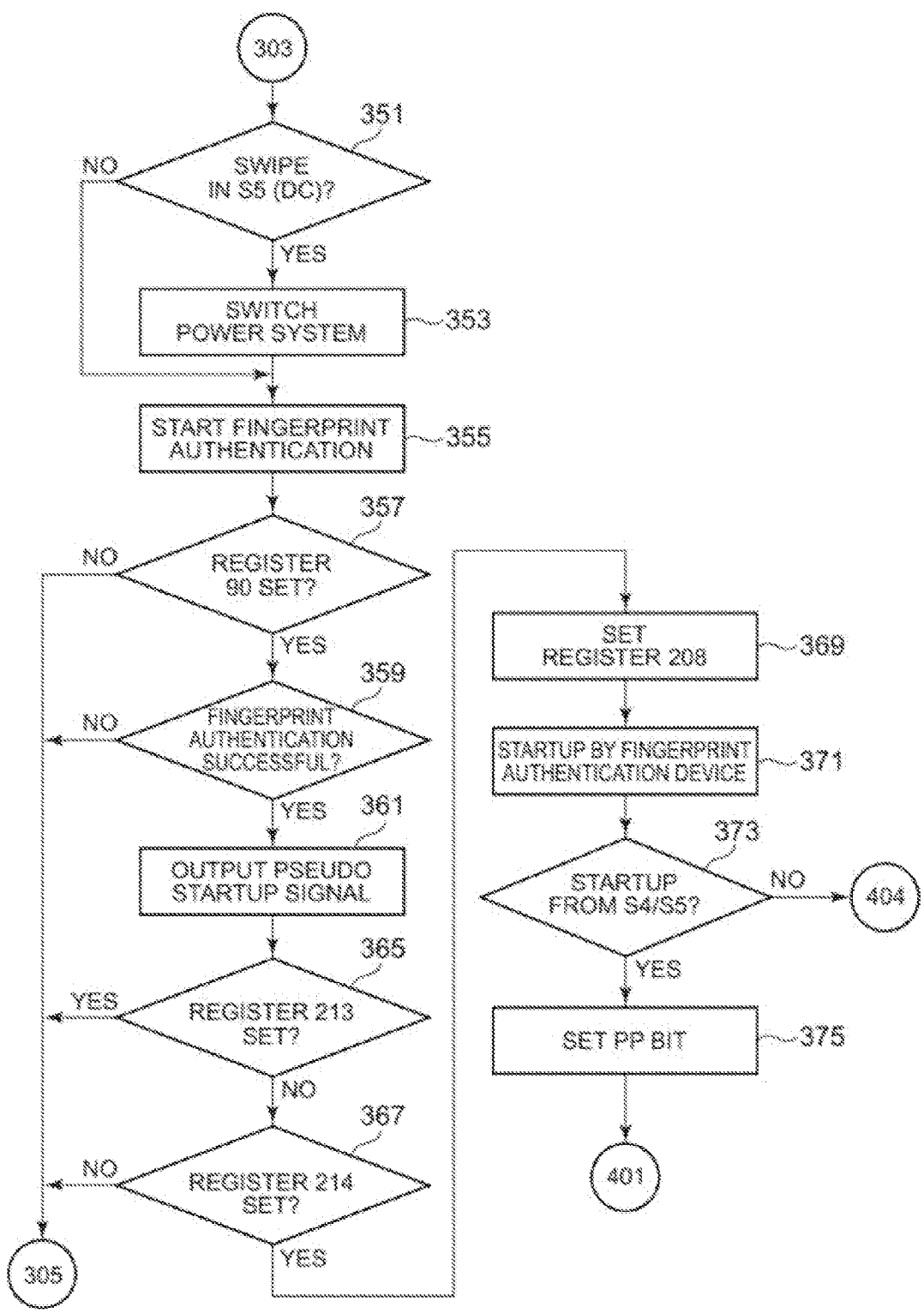
FIG. 9 is a flowchart showing a procedure from when a finger is swiped on the fingerprint authentication device to when the PP bit is set.
Figure 10:
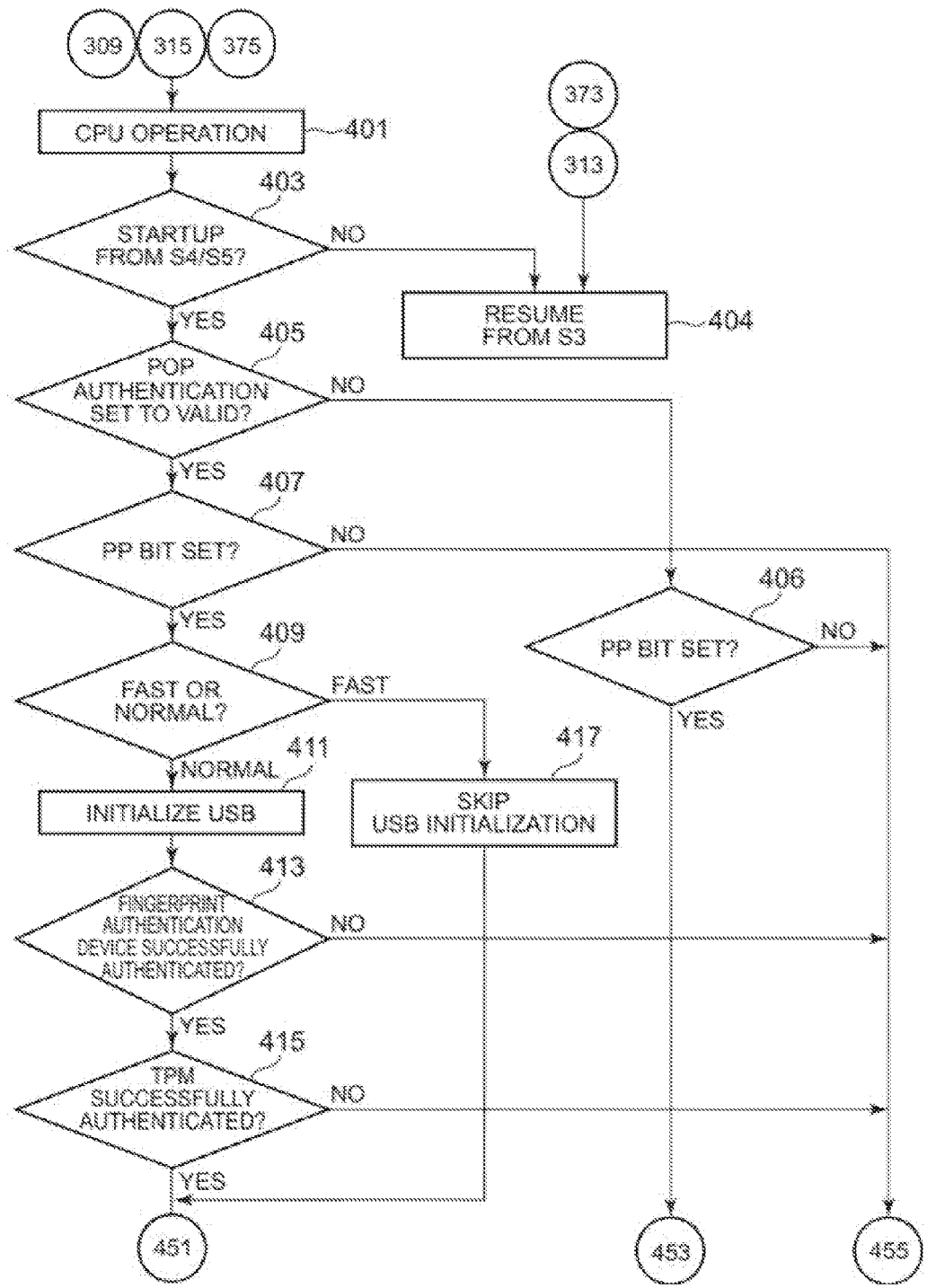
FIG. 10 is a flowchart showing a procedure in which a CRTM sets physical presence in a TPM.
Figure 11:
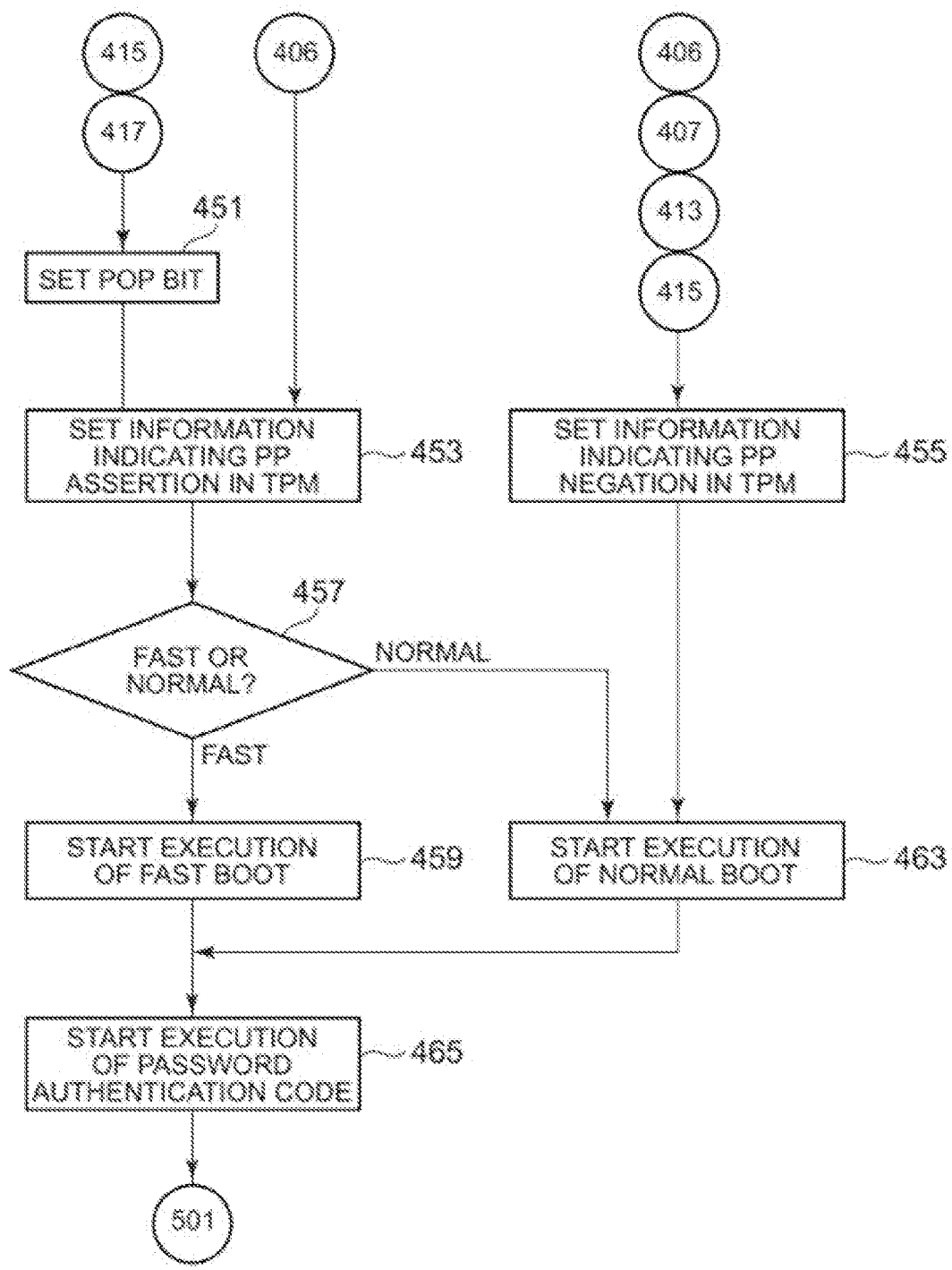
FIG. 11 is a flowchart showing a procedure in which the CRTM authenticates the physical presence.
Figure 12:
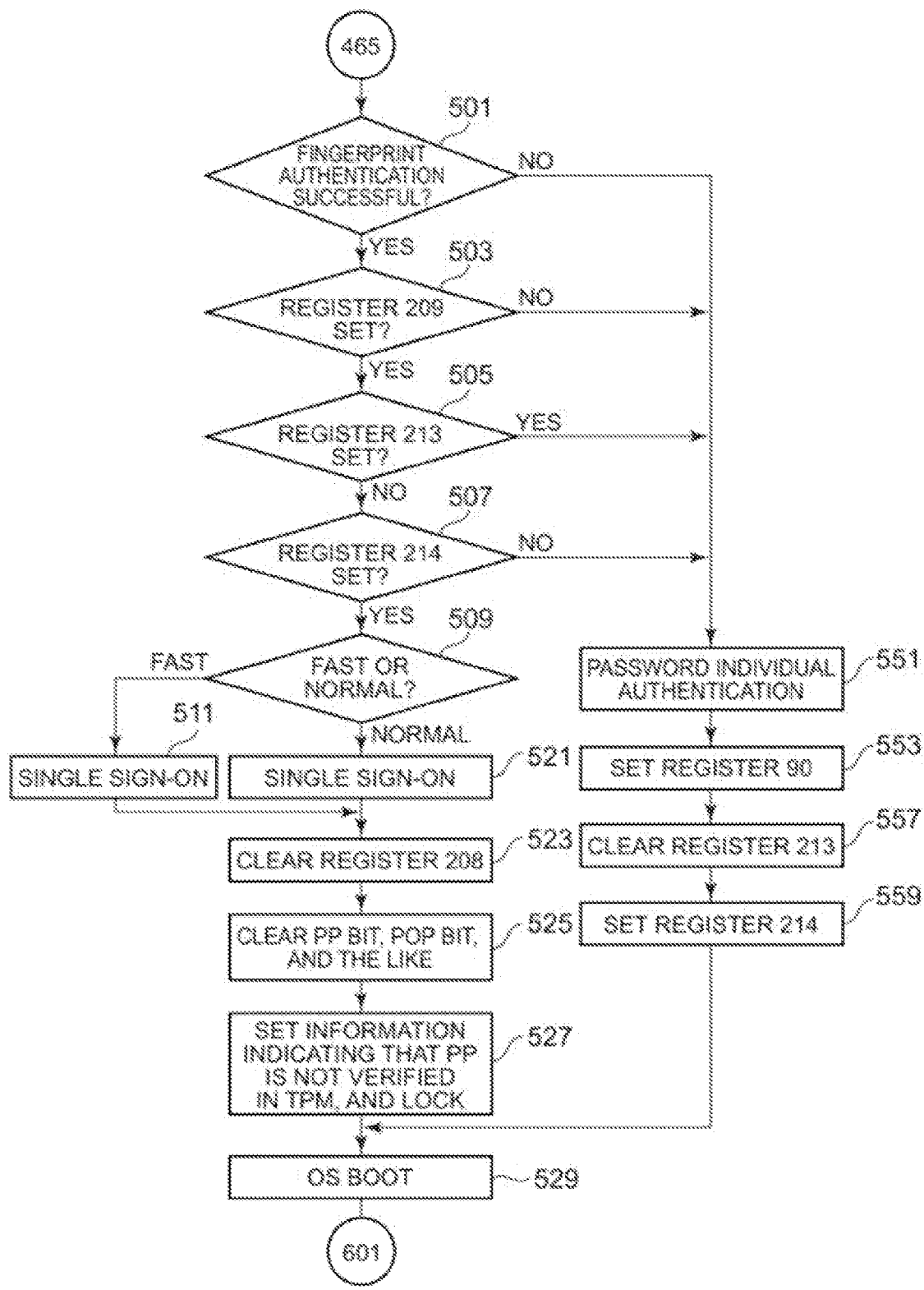
FIG. 12 is a flowchart showing a procedure in which password authentication code performs authentication by single sign-on or individual authentication.
Figure 13:
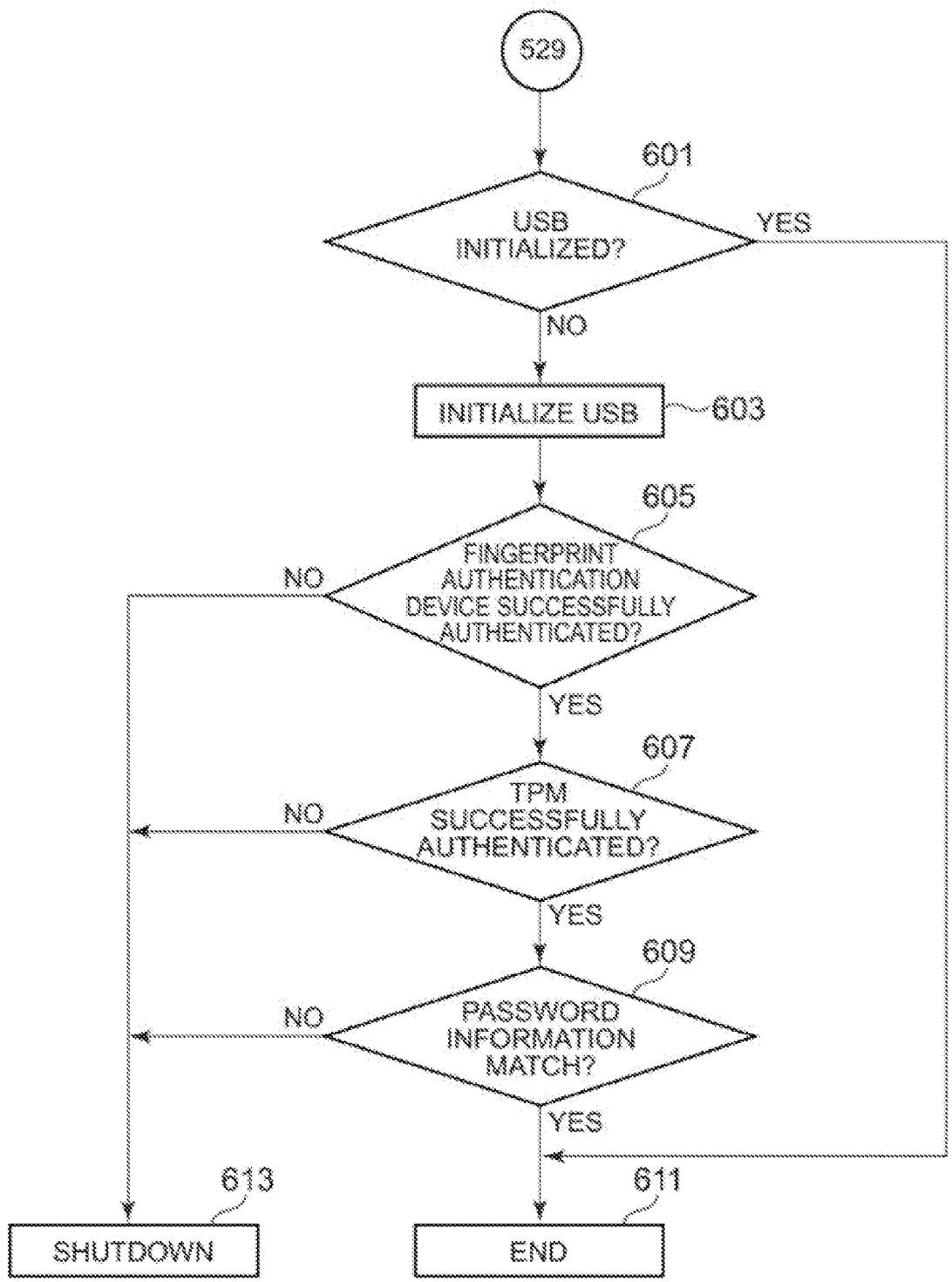
FIG. 13 is a flowchart showing a procedure of preventing replacement of the fingerprint authentication device skipped in fast boot by initializing USB after completion of OS boot.

The following describes a startup method and an authentication method of the laptop PC 10, with reference to FIGS. 8 to 12. FIGS. 8 to 12 are flowcharts showing operational procedures of the laptop PC 10 executed by the software and the hardware shown in FIGS. 1 to 7. FIG. 8 mainly shows an operational procedure using the hardware communication circuit up to when the PP bit is set in the case where the power button 47 is pressed to initiate the startup. FIG. 9 shows an operational procedure using the hardware communication circuit up to when the PP bit is set in the case where the fingerprint authentication device 31 successfully performs authentication to initiate the startup. FIGS. 10 and 11 show an operational procedure using the software communication circuit up to when the CRTM authentication code 121 sets the physical presence to the TPM. FIG. 12 mainly shows an operational procedure using the software communication circuit when the password authentication code 131 performs authentication by single sign-on or individual authentication. FIG. 13 is a flowchart showing a procedure of preventing replacement of the fingerprint authentication device skipped in the fast boot by initializing the USB after the OS completes booting.

In block 301 in FIG. 8, in a previously-executed secure operating environment, the binding data 95, the BIOS password 96, and the login password 97 are stored in the data storage unit 91 in the fingerprint authentication device 31. It is assumed that the state of the register 90 is undefined. The BIOS password 153 is registered in the secure NVRAM 43. The register 208 in the power controller 39 is set to the logic value "00" (normal boot) in block 523 in FIG. 12. It is also assumed that the states of the registers 213 and 214 are undefined. The laptop PC 10 has transitioned to any of the power states that are the S3 state, the S4 state, the S5 (AC) state, and the S5 (DC) state, and the four power systems of the DC/DC converter 41 shown in FIG. 2 are in operation according to the corresponding power state.

In block 303, the fingerprint authentication device 31 waits for a swipe of the user's finger. In the case where the current power state of the laptop PC 10 is the S5 (DC) state, the power controller 39 controls the switching circuit 227 so as to supply power to the fingerprint authentication device 31 from the VCC1 system. If the user does not initiate the startup by the fingerprint authentication device 31, the procedure goes to block 305 to initiate the startup by the pressing of the power button 47, the reception of a magic packet for WOL, or the pressing of the Function key of the keyboard 37. When the user swipes his/her finger on the fingerprint sensor 33, the procedure goes to block 351 in FIG. 9. In block 305, the procedure goes to block 311 in the case of the startup by the pressing of the power button 47, and block 309 in the case of the startup by the WOL or by the pressing of the Function key. After the startup is initiated in block 309, the procedure goes to block 401 in FIG. 10.

When the power button 47 is pressed in block 311, the laptop PC 10 transitions from any of the S3 to S5 states to the S0 state. Upon receiving the startup signal via the startup signal line 203 as a result of pressing the power button 47, the power controller 39 controls the DC/DC converter 41 to supply power to all devices operating in the S0 state. The southbridge 21 references to the register 215, and turns on the switch 207 when the S4 or S5 state is set.

When the power button 47 is pressed while the switch 207 is on, the startup signal is sent to the power controller 39 via the PP bit setting line 205. Upon receiving the startup signal via the PP bit setting line 205, a hardware logic circuit of the power controller 39 determines in block 313 that the laptop PC 10 is cold-started, and sets the PP bit in the register 209 in block 315. The procedure then goes to block 401 in FIG. 10. In the case where the power controller 39 does not receive the startup signal via the PP bit setting line 205 in block 313, the procedure goes to block 404 in FIG. 10 without setting the PP bit, on the ground that the laptop PC 10 is warm-started as a result of pressing the power button 47.

The following describes a procedure in the case where the finger is swiped on the fingerprint sensor 33 in block 303, with reference to FIG. 9. In the case where the power state of the laptop PC 10 when swiping the finger is the S5 (DC) state in block 351, the VCC2 system does not supply power to the fingerprint authentication device 31, and the VCC1 system is unable to supply power necessary for the authentication mode. Accordingly, in block 353, when the finger is detected by the proximity sensor 82, the input/output control unit 89 sends a signal requesting switching of the power source to the power controller 39 via the line 219. Upon receiving the signal, the power controller 39 controls the switching circuit 227 to switch the power source of the fingerprint authentication device 31 to the VCC2 system without instantaneous interruption.

In the case where the power state of the laptop PC 10 is other than the S5 (DC) state, the fingerprint authentication device 31 is already supplied with power from the VCC2 system, and so the procedure goes to block 355 to start fingerprint authentication without switching the power source by the switching circuit 227. In block 357, the input/output control unit 89 references to the register 90, to determine whether or not the binding bit is set to the logic value "1." When the binding bit is not set, there is a possibility that the fingerprint authentication device 31 is disconnected from the laptop PC 10, another fingerprint authentication device is connected to the laptop PC 10, or the power of the fingerprint authentication device 31 is stopped. In this case, the startup by the fingerprint authentication device 31 is terminated, and the procedure returns to block 305 in FIG. 8.

When the binding bit is set, the verification unit 85 performs fingerprint authentication by comparing verification fingerprint data extracted from an input fingerprint with the user's template registered in the template storage unit 87 beforehand. The verification unit 85 performs authentication for the finger registered in association with the normal boot beforehand or the finger registered in association with the fast boot beforehand.

In the case where the fingerprint authentication is successful for the registered finger, the input/output control unit 89 sets the authentication success flag 94 in the data storage unit 91. When the fingerprint authentication is successful, the input/output control unit 89 outputs the pseudo startup signal to the line 223 in block 361. The input/output control unit 89 also outputs the logic value "01" when authenticating the finger corresponding to the fast boot and the logic value "11" when authenticating the finger corresponding to the normal boot, to the power controller 39 via the line 221. In the case where the authentication fails for any of the fingers, the procedure returns to block 305 without any output to the power controller 39. Since the boot does not proceed in the case of the authentication failure, the startup needs to be initiated by the pressing of the power button 47 or the WOL in block 305. It is therefore desirable to notify the user of the authentication failure by a prompt, such as turning on/off an LED.

In block 365, the power controller 39 which receives the pseudo startup signal via the startup signal line 203 determines whether or not the binding bit of the logic value "1" is set in the register 213. In the case where the binding bit is set, the procedure returns to block 305 because individual authentication is not performed by the user inputting the BIOS password after the fingerprint authentication device 31 is connected. In the case where the binding bit is cleared to the logic value "0", the procedure goes to block 367. When the power of the VCC1 system is stopped, the register 213 is set to the logic value "0" also. This makes it impossible to detect whether or not the startup by the password input by the user ends. This problem, however, can be complemented in block 367. In block 367, the power controller 39 determines whether or not the power bit of the logic value "1" is set in the register 214.

In the case where the power bit is cleared to the logic value "0", the power controller 39 determines that this is the first boot after the power of the VCC1 system is stopped. The procedure accordingly returns to block 305 to terminate the startup by the fingerprint authentication device 31. In the case where the power bit is set to the logic value "1," the procedure goes to block 369. In block 369, the power controller 39 sets the logic value "01" in the register 208 in the case of receiving the signal indicating the fast boot from the fingerprint authentication device 31 via the line 221, and the logic value "11" in the register 208 in the case of receiving the signal indicating the normal boot from the fingerprint authentication device 31 via the line 221. The logic value "00" in block 301 is maintained in the case where the power controller 39 does not receive any of the signals.

Since the security of the fingerprint authentication device 31 is confirmed in blocks 357, 365, and 367, in block 371 the power controller 39 controls the DC/DC converter 41 to operate all of the power systems VCC1 to VCC4 so that power is supplied to the devices operating in the S0 state. In block 373, the procedure goes to block 375 in the case where the power state in block 301 in FIG. 8 is the S4 or S5 state, and block 404 in FIG. 10 in the case where the power state is the S3 state.

In block 375, since the southbridge 21 sets the switch 207 to on, the pseudo startup signal is output to the power controller 39 via the PP bit setting line 205. Upon receiving the pseudo startup signal, the power controller 39 determines that the laptop PC 10 is cold-started by the pressing of the power button 47, or the authentication of the fingerprint authentication device 31, and sets the PP bit in the register 209. The procedure then goes to block 401 in FIG. 10. In the case of going from block 373 to block 404, the power controller 39 does not set the PP bit because the switch 207 is off.

The operation using only the hardware communication circuit has been described above. The following describes an operational procedure using the software communication circuit by the CPU 11 executing the BIOS, with reference to FIG. 10. In block 401, the CPU 11 supplied with power starts operation. A start address of the CRTM stored in the boot block 27a is set in a pointer executed first by the CPU 11 when receiving the signal of the cold start from the southbridge 21 in block 403. After main devices such as the CPU 11, the northbridge 13, and the southbridge 21 undergo minimum testing and initialization, the execution of the CRTM authentication code 121 begins. At this time, the initialization of the USB peripheral devices is not performed.

When the laptop PC 10 is warm-started, the procedure goes to block 404. In block 404, a startup routine of the warm start is executed. Since contexts of many devices are held in the main memory 15 before the startup, the laptop PC 10 becomes usable in a shorter time than in the fast boot. In the warm start, the CRTM authentication code 121 is not executed and so physical presence authentication and single sign-on authentication are not performed, unlike the fast boot and the normal boot.

In block 405, the CRTM authentication code 121 references the POP authentication validity flag 151 in the secure NVRAM 43, to determine whether or not physical ownership presence authentication is set to valid. In the case where the user sets the POP authentication validity flag 151 in the NVRAM 43 so as not to perform physical ownership presence authentication, the procedure goes to block 406 to perform physical presence authentication by a conventional method.

In block 406, the CRTM authentication code 121 determines whether or not the PP bit is set in the register 209 in the power controller 39. When the laptop PC 10 is cold-started by the pressing of the power button 47 or by the pseudo pressing by the fingerprint authentication device 31, the PP bit is set in the register 209 in block 315 in FIG. 8 or block 375 in FIG. 9, so that the physical presence is asserted. In this case, the procedure goes to block 453 in FIG. 11. When the laptop PC 10 is cold-started by the WOL, the PP bit is not set in the register 209, so that the physical presence is negated. In this case, the procedure goes to block 455 in FIG. 11.

In the case where the user sets the POP authentication validity flag 151 in the secure NVRAM 43 so as to perform physical ownership presence authentication in block 405, in block 407 the CRTM authentication code 121 determines whether or not the PP bit is set in the register 209. In the case where the PP bit is not set, the procedure goes to block 455 as the startup is initiated by the WOL. In the case where the PP bit is set, the procedure goes to block 409.

In block 409, the CRTM authentication code 121 references to the register 208 to determine the boot type. When the logic value "01" is set in the register 208, the CRTM authentication code 121 determines that the boot type is the fast boot, and skips USB peripheral device initialization in block 417. The procedure then goes to block 451 in FIG. 11. Here, the initialization of the USB interface of the fingerprint authentication device 31 is skipped. When the logic value "11" is set in the register 208, the CRTM authentication code 121 determines that the boot type is the normal boot, and initializes at least the USB interface of the fingerprint authentication device 31 in block 411.

In the normal boot, a relatively long time is taken to initialize the USB peripheral devices. Once the USB interface of the fingerprint authentication device 31 is initialized, however, the system becomes able to communicate with the fingerprint authentication device 31 via the southbridge 21. In block 413, the CRTM authentication code 121 authenticates the fingerprint authentication device 31 using the TPM 45. The CRTM authentication code 121 requests the binding data 95 from the fingerprint authentication device 31. The input/output control unit 89 in the fingerprint authentication device 31 extracts the binding data 95 from the data storage unit 91 and passes the binding data to the CRTM authentication code 121, in the case where the authentication success flag 94 indicating the fingerprint authentication success is set in block 359 in FIG. 9.

The CRTM authentication code 121 sends the binding data 95 to the TPM 45. In the case where the authentication success flag 94 is not set, the input/output control unit 89 does not pass the binding data 95 to the CRTM authentication code 121, so that the procedure goes to block 455 on the ground that the physical ownership presence authentication fails. The TPM 45 stores the received binding data 95 in an internal Platform Configuration Register ("PCR").

Having received the binding data 95, the TPM 45 calculates a hash value of the binding data 95 stored in the PCR, and compares the hash value with the binding data 95 of the fingerprint authentication device 31 hashed and registered in the PCR beforehand. In the case where the two values match as a result of comparison, the TPM 45 sends the fingerprint ownership key stored therein to the CRTM authentication code 121. In the case where the two values do not match, the TPM 45 does not send the fingerprint ownership key to the CRTM authentication code 121.

In the case of receiving the fingerprint ownership key from the TPM 45, the CRTM authentication code 121 determines that the TPM 45 successfully authenticates the fingerprint authentication device 31, and sends the fingerprint ownership key to the fingerprint authentication device 31. The procedure then goes to block 415. In the case of not receiving the fingerprint ownership key, on the other hand, the procedure goes to block 455 on the ground that the physical ownership presence authentication fails.

The fingerprint ownership key is a value corresponding to a template of a fingerprint image generated by the fingerprint sensor 33 for registration in the template storage unit 87, and the same value is also stored in the data storage unit 91 in the fingerprint authentication device 31. In block 415, the input/output control unit 89 in the fingerprint authentication device 31 determines whether or not the fingerprint ownership key received from the TPM 45 matches the fingerprint ownership key 93 stored in the data storage unit 91. In the case where the two keys match, the input/output control unit 89 determines that the fingerprint authentication device 31 successfully authenticates the TPM 45, and asserts the physical ownership presence. The procedure then goes to block 451 in FIG. 11. In the case where the two keys do not match, the procedure goes to block 455 on the ground that the physical ownership presence authentication fails.

In blocks 413 and 415, the fingerprint authentication device 31 and the TPM 45 bi-directionally authenticate each other as trustable, thereby ensuring that the physical ownership presence is negated when at least one of the fingerprint authentication device 31 and the TPM 45 is maliciously replaced from the platform. In the fast boot, the procedure goes from block 417 to block 451 while skipping blocks 413 and 415. This incurs a possibility that the tampered fingerprint authentication device 31 is used.

In this embodiment, however, the possibility of tampering with the fingerprint authentication device 31 is detected in blocks 357, 365, and 367 in FIG. 9 to execute the process of block 551 in FIG. 12 in the normal boot by the pressing of the power button 47, as a result of which the security level can be maintained. In block 451 in FIG. 11, the CRTM authentication code 121 receives the notification asserting the physical ownership presence from the fingerprint authentication device 31, and sets the POP bit of the logic value 1 in the register 211 in the power controller 39.

In block 453, when the CRTM authentication code 121 detects either one of the case where the POP authentication validity flag 151 is set in the secure NVRAM 43 and the POP bit is set in the register 211 (block 451) and the case where the POP authentication validity flag 151 is not set in the secure NVRAM 43 and the PP bit is set in the register 209 (block 406), the CRTM authentication code 121 sends a predetermined command to the TPM 45. Upon receiving the command, the TPM 45 internally asserts a physical presence flag (set to true).

In block 455, when the CRTM authentication code 121 detects either one of the case where the POP authentication validity flag 151 is set in the secure NVRAM 43 and the POP bit is not set in the register 211 (block 407) and the case where the POP authentication validity flag 151 and the PP bit are not set (block 406), the CRTM authentication code 121 sends a predetermined command to the TPM 45. The TPM 45 negates the physical presence flag (set to false).

When the setting of the physical presence flag ends in block 453 or 455, the procedure goes to block 457. In block 457, the CRTM authentication code 121 references to the register 208, to determine whether the fast boot or the normal boot is set. In the case of determining that the normal boot is set based on the logic value "00" or "11," the CRTM authentication code 121 causes the POST code 125 to start executing the normal boot in block 463. In the case of determining that the fast boot is set based on the logic value "01," the CRTM authentication code 121 causes the POST code 125 to start executing the fast boot in block 459.

The fast boot can be completed in a shorter time than the normal boot, by skipping initialization of some devices that can be initialized by the OS or by skipping display of a wait screen for transitioning to a BIOS setup screen. In block 465, the password authentication code 131 stored in the system block 27*b* is executed following or during the execution of the POST code 125. The procedure then goes to block 501 in FIG. 12. Block 501 is reached by the startup by either the pressing of the power button 47 or the authentication success of the fingerprint authentication device 31.

In block 501, the password authentication code 131 references to the register 208 in the power controller 39, to determine whether or not the fingerprint authentication for any finger is successful. When the boot bit is set to the logic value "01" (fast boot) or the logic value "11" (normal boot) in this startup, the password authentication code 131 determines that the authentication is successful. The procedure then goes to block 503. When the boot bit is set to the logic value "00," the procedure goes to block 551 because the fingerprint authentication device 31 outputs no authentication result to the power controller 39, indicating that the startup is initiated by the pressing of the power button 47.

In the case of the startup by the pressing of the power button 47, the register 208 maintains the logic value "00" and so the normal boot is executed. In block 503, the password authentication code 131 references to the register 211 in the power controller 39, to determine whether or not the POP bit is set to the logic value "1." When the POP bit is set, the procedure goes to block 505. When the POP bit is not set, the procedure goes to block 551.

In block 505, the password authentication code 131 references to the register 213 in the power controller 39, to determine whether or not the binding bit is set to the logic value "1." When the binding bit is set, the procedure goes to block 551 because there is a possibility that the fingerprint authentication device 31 is disconnected. When the binding bit is not set, the procedure goes to block 507. In block 507, the password authentication code 131 references to the register 214 in the power controller 39, to determine whether or not the power bit is set to the logic value "1." When the power bit is set, the procedure goes to block 509. When the power bit is not set, the procedure goes to block 551 because there is a possibility that the power of the VCC1 system is stopped.

In block 509, the password authentication code 131 references to the register 208 in the power controller 39. When the fast boot is set, the procedure goes to block 511. When the normal boot is set, the procedure goes to block 521. In the fast boot, the USB interface of the fingerprint authentication device 31 is not initialized in block 417 in FIG. 10, and so the password authentication code 131 cannot acquire the password from the data storage unit 91 in the fingerprint authentication device 31. Accordingly, in block 511, the password authentication code 131 accesses the system using the BIOS password 153 registered in the secure NVRAM 43.

In the normal boot, on the other hand, in block 521 the password authentication code 131 acquires the BIOS password 96 from the data storage unit 91 in the fingerprint authentication device 31 via the USB interface connected to the southbridge 21. The password authentication code 131 compares hash values calculated from the acquired BIOS password 96 and the BIOS password 153 registered in the secure NVRAM 43. If the BIOS password is not tampered with after the registration, the two values match. Having confirmed the match, the password authentication code 131 accesses the system using the password 153 registered in the NVRAM 43.

In each of blocks 511 and 521, the password authentication code 131 completes the BIOS password authentication and proceeds to the subsequent process, without intervention by the user. The password authentication code 131 sends the HDD password to the HDD 29. The HDD 29 performs authentication by comparing the received HDD password and the HDD password registered in the disk, and permits subsequent access from the system. Such a method of performing, by single access, individual authentication of a plurality of passwords performed by the user is referred to as single sign-on ("SSO").

In block 551, the password authentication code 131 performs individual authentication by displaying, on the LCD 19, a prompt for individually requesting the set BIOS password. The user inputs the passwords constituting the requested BIOS password in sequence. In block 553, the password authentication code 131 sets the binding bit in the register 90 in the fingerprint authentication device 31 according to need. In block 557, the password authentication code 131 sets the logic value "0" in the register 213. In block 559, the password authentication code 131 sets the logic value "1" in the register 214.

The individual authentication exhibits a high security level in the sense that the user directly inputs the password, but also has problems such as an inconvenience of password input or storage for the user and a longer boot time. The single sign-on solves these problems, but is lower in security level than the individual authentication. In view of this, the single sign-on by the normal boot in block 521 is performed under a condition that the mutual authentication between the fingerprint authentication device 31 and the TPM 45 is performed in blocks 413 and 415 in FIG. 10, and, as a result, the physical ownership presence is asserted, thereby maintaining the security level.

Moreover, the single sign-on by the fast boot in block 511 can be started only by the user who knows the BIOS password, because the individual authentication is performed by the normal boot by the pressing of the power button 47 in blocks 357, 365, and 367 in FIG. 9 and blocks 505, 507, and 551 when there is a possibility that the fingerprint authentication device 31 is disconnected from the laptop PC 10 for tampering. Once the user who knows the password initiates the startup, the security of the fingerprint authentication device 31 can be checked under the trustable user, so that the fast boot or the normal boot can be subsequently performed using the fingerprint authentication device 31.

In block 523, the password authentication code 131 sets the logic value "00" in the register 208. In block 525, the password authentication code 131 sets the PP flag and the POP flag in the respective registers 209 and 211 to the logic value "0." In block 527, the password authentication code 131 sends a command to the TPM 45 to negate the physical presence flag, and also sends another command to prevent the physical presence flag from being rewritten. In block 529, the BIOS boot ends and the OS boot begins. The password authentication code 131 passes a logon password to the authentication module of the OS through a secure storage area in the main memory 15 that can be shared with the OS. The OS performs authentication by comparison with a login password stored in a secure area.

Thus, in the S4 or S5 state, the boot can be completed up to the OS without password input, not only by the normal boot by the pressing of the power button 47 but also by the normal boot or the fast boot by the authentication of the fingerprint authentication device 31. In block 601 in FIG. 13, the OS which has completed booting determines, as early as possible, whether or not the initialization of the USB interface of the fingerprint authentication device 31 is completed. In the case where the initialization is completed in block 411 in FIG. 10, the procedure goes to block 611 to end.

In the case where the initialization is not completed through block 417 in FIG. 10, the OS immediately initializes the USB interface in block 603. After the initialization ends, the system is able to communicate with the fingerprint authentication device 31 via the southbridge 21. In block 605, the OS issues an SMI to transition to System Management Mode ("SMM"), and transfers control to the CRTM authentication code 121.

The CRTM authentication code 121 authenticates the fingerprint authentication device 31 using the TPM 45, in the same process as block 413 in FIG. 10. When the authentication fails, the procedure goes to block 613 where the CRTM authentication code 121 forcefully shuts down the system or terminates the operation of the system. When the authentication is successful, the procedure goes to block 607. In block 607, the CRTM authentication code 121 authenticates the TPM 45 using the fingerprint authentication device 31, in the same process as block 415 in FIG. 10.

When the authentication fails, the procedure goes to block 613. When the authentication is successful, the procedure goes to block 609. In block 609, the password authentication code 131 acquires the BIOS password 96 from the data storage unit 91 in the fingerprint authentication device 31, in the same process as block 521 in FIG. 12. The password authentication code 131 compares hash values calculated from the acquired BIOS password 96 and the BIOS password 153 registered in the secure NVRAM 43. In the case where the two values do not match, the procedure goes to block 613. In the case where the two values match, the procedure goes to block 611.

According to this procedure, even when the fingerprint authentication device 31 is replaced by an unauthorized act and then the fast boot is performed, the same security level as in the normal boot can be ensured by determining, immediately after the OS boot is completed, whether or not the fingerprint authentication device 31 is trustable. The fast boot in the present invention may be performed using a biometric authentication device that uses other biometric information such as palm shape, retina, iris, voice, vein, or the like, instead of the fingerprint authentication device 31. Moreover, the registers 208, 209, 211, 213, and 214 in the power controller 39 may be implemented in the EC 35.

Though the present invention has been described by way of the specific embodiment shown in the drawings, the present invention is not limited to the embodiment shown in the drawings, and any known structure may be employed so long as the advantageous effects of the present invention can be achieved.

DESCRIPTION OF SYMBOLS 10 laptop PC
31 fingerprint authentication device
47 power button
208, 209, 211, 213, 214 volatile register

What is claimed is:

1. A computer that is able to be started by a biometric authentication device, the computer comprising:
   a power control circuit for starting power of the computer in response to one or more of pressing of a power button and successful authentication by the biometric authentication device; and
   a boot execution circuit for executing normal boot when the computer is started by the pressing of the power button, and executing fast boot when the computer is started by the successful authentication by the biometric authentication device, the normal boot requesting password input by a user, and the fast boot using a password stored in the computer to access a system without acquiring a password from the user and the biometric authentication device, wherein the fast boot is executed in response to authenticating the biometric authentication device, the biometric authentication device being authenticated in response to an authentication bit being set in volatile memory on the biometric authentication device, the authentication bit being set during a normal boot such that if the authentication device is subsequently disconnected from a power supply the authentication bit set in the volatile memory is reset to indicate at a subsequent boot that the authentication device has not been authenticated.

2. The computer according to claim 1, wherein the fast boot omits initialization of an interface of the biometric authentication device to the system.

3. The computer according to claim 1, wherein the boot execution circuit completes the fast boot to boot of an operating system, without requesting the password input by the user.

4. The computer according to claim 1, wherein the boot execution circuit authenticates the biometric authentication device using authentication data registered in a security chip when executing the normal boot by the pressing of the power button, and omits authenticating the biometric authentication device when executing the fast boot.

5. The computer according to claim 4, wherein in the case of executing the fast boot, the boot execution circuit, after completing boot of an operating system, initializes an interface of the biometric authentication device, authenticates the biometric authentication device using the authentication data registered in the security chip, and shuts down the system when the authentication fails.

6. The computer according to claim 4, wherein in the case of executing the fast boot, the boot execution circuit, after completing boot of an operating system, initializes an interface of the biometric authentication device, compares a password stored in the biometric authentication device with the password stored in the computer, and shuts down the system when the passwords do not match.

7. The computer according to claim 1, wherein in the case where the biometric authentication device is disconnected from the computer and then reconnected to the computer after previous boot, the power control circuit prohibits the computer from being started by the biometric authentication device, and the boot execution circuit requests the password input by the user when the computer is started by the pressing of the power button to execute the normal boot.

8. The computer according to claim 1, wherein in the case where power of the power control circuit is stopped after previous boot, the power control circuit prohibits the computer from being started by the biometric authentication device, and the boot execution circuit requests the password input by the user when the computer is started by the pressing of the power button to execute the normal boot.

9. The computer according to claim 1, wherein in the case where the biometric authentication device is disconnected from the computer and then reconnected to the computer after previous boot, the biometric authentication device stops notifying the power control circuit whether authentication is successful until the notification is permitted by the boot execution circuit when executing the normal boot by the pressing of the power button.

10. The computer according to claim 1, wherein the biometric authentication device is a fingerprint authentication device that includes a USB interface.

11. The computer according to claim 10, wherein the fingerprint authentication device authenticates one or more of a finger corresponding to the normal boot and a finger corresponding to the fast boot, and the boot execution circuit executes one or more of the normal boot and the fast boot according to the authenticated finger.

12. A computer that is able to be started by a biometric authentication device, the computer comprising:
   a power control circuit for starting power of the computer in response to successful authentication by the biometric authentication device; and
   a boot execution circuit for executing normal boot when the biometric authentication device authenticates a first part of a human body to start the computer, and executing fast boot when the biometric authentication device authenticates a second part of the human body to start the computer, the fast boot being completed in a shorter time than the normal boot, wherein the fast boot is executed in response to authenticating the biometric authentication device, the biometric authentication device being authenticated in response to an authentication bit being set in volatile memory on the biometric authentication device, the authentication bit being set during a normal boot such that if the authentication device is subsequently disconnected from a power supply the authentication bit set in the volatile memory is reset to indicate at a subsequent boot that the authentication device has not been authenticated.

13. A computer connectable to a biometric authentication device, the computer comprising:
   a system device connected to the biometric authentication device by a software communication circuit;
   a power control circuit connected to the biometric authentication device by a hardware communication circuit, for starting power of the computer when receiving a signal indicating pressing of a power button or successful authentication by the biometric authentication device via the hardware communication circuit; and
   a boot execution circuit for executing normal boot when the computer is started by the pressing of the power button, and executing fast boot when the computer is started by the successful authentication by the biometric authentication device, the normal boot involving initialization of the software communication circuit, and the fast boot omitting the initialization of the software communication circuit, wherein the fast boot is executed in response to authenticating the biometric authentication device, the biometric authentication device being authenticated in response to an authentication bit being set in volatile memory on the biometric authentication device, the authentication bit being set during a normal boot such that if the authentication device is subsequently disconnected from a power supply the authentication bit set in the volatile memory is reset to indicate at a subsequent boot that the authentication device has not been authenticated.

14. A method of starting a computer connectable to a biometric authentication device, the method comprising:
   starting power of the computer in response to one or more of pressing of a power button and successful authentication by the biometric authentication device;
   executing normal boot when the computer is started by the pressing of the power button, the normal boot requesting password input by a user; and
   executing fast boot when the computer is started by the successful authentication by the biometric authentication device, the fast boot using a password stored in the computer to access a system without acquiring a password from the user and the biometric authentication device, wherein the fast boot is executed in response to authenticating the biometric authentication device, the biometric authentication device being authenticated in response to an authentication bit being set in volatile memory on the biometric authentication device, the authentication bit being set during a normal boot such that if the authentication device is subsequently disconnected from a power supply the authentication bit set in the volatile memory is reset to indicate at a subsequent boot that the authentication device has not been authenticated.

15. The method according to claim 14, wherein executing the fast boot further comprises omitting initialization of an interface of the biometric authentication device to the system.

16. The method according to claim 15, further comprising:
   executing an operating system following the fast boot, to initialize the interface; and
   stopping an operation of the system when failing to authenticate the biometric authentication device using authentication data registered in a security chip.

17. The method according to claim 15, further comprising:
   executing an operating system following the fast boot, to initialize the interface; and
   stopping an operation of the system when a password stored in the biometric authentication device and the password stored in the computer do not match.

18. The method according to claim 14, further comprising prohibiting the computer from being started by the biometric authentication device, and executing the normal boot when the power button is pressed, upon detecting that the biometric authentication device is disconnected from the computer.

19. A method of starting a computer connectable to a biometric authentication device, the method comprising:
   starting power of the computer in response to successful authentication by the biometric authentication device;
   executing normal boot when the biometric authentication device authenticates a first part of a human body to start the computer; and
   executing fast boot when the biometric authentication device authenticates a second part of the human body to start the computer, the fast boot being completed in a shorter time than the normal boot, wherein the fast boot is executed in response to authenticating the biometric authentication device, the biometric authentication device being authenticated in response to an authentication bit being set in volatile memory on the biometric authentication device, the authentication bit being set during a normal boot such that if the authentication device is subsequently disconnected from a power supply the authentication bit set in the volatile memory is reset to indicate at a subsequent boot that the authentication device has not been authenticated.

20. A method of starting a computer connectable to a biometric authentication device, the method comprising:
   starting power of the computer in response to one or more of pressing of a power button and successful authentication by the biometric authentication device;
   executing normal boot when the computer is started by the pressing of the power button, the normal boot involving initialization of the biometric authentication device; and
   executing fast boot when the computer is started by the successful authentication by the biometric authentication device, the fast boot omitting the initialization of the biometric authentication device, wherein the fast boot is executed in response to authenticating the biometric authentication device, the biometric authentication device being authenticated in response to an authentication bit being set in volatile memory on the biometric authentication device, the authentication bit being set during a normal boot such that if the authentication device is subsequently disconnected from a power supply the authentication bit set in the volatile memory is reset to indicate at a subsequent boot that the authentication device has not been authenticated.

21. A computer program causing a computer that is started in response to one or more of pressing of a power button or successful authentication by a biometric authentication device, to realize:
   a function of executing normal boot when the computer is started by the pressing of the power button, the normal boot requesting password input by a user; and
   a function of executing fast boot when the computer is started by the successful authentication by the biometric authentication device, the fast boot using a password stored in the computer to access a system without acquiring a password from the user and the biometric authentication device, the biometric authentication device being authenticated in response to an authentication bit being set in volatile memory on the biometric authentication device, the authentication bit being set during a normal boot such that if the authentication device is subsequently disconnected from a power supply the authentication bit set in the volatile memory is reset to indicate at a subsequent boot that the authentication device has not been authenticated.

22. A computer program causing a computer that is started in response to successful authentication by a biometric authentication device, to realize:
   a function of executing normal boot when the biometric authentication device authenticates a first part of a human body to start the computer; and
   a function of executing fast boot when the biometric authentication device authenticates a second part of the human body to start the computer, the fast boot being completed in a shorter time than the normal boot, wherein the fast boot is executed in response to authenticating the biometric authentication device, the biometric authentication device being authenticated in response to an authentication bit being set in volatile memory on the biometric authentication device, the authentication bit being set during a normal boot such that if the authentication device is subsequently disconnected from a power supply the authentication bit set in the volatile memory is reset to indicate at a subsequent boot that the authentication device has not been authenticated.

23. A computer program causing a computer that is started in response to one or more of pressing of a power button and successful authentication by a biometric authentication device, to realize:
   a function of executing normal boot when the computer is started by the pressing of the power button, the normal boot involving initialization of the biometric authentication device; and
   a function of executing fast boot when the computer is started by the successful authentication by the biometric authentication device, the fast boot omitting the initialization of the biometric authentication device, the biometric authentication device being authenticated in response to an authentication bit being set in volatile memory on the biometric authentication device, the authentication bit being set during a normal boot such that if the authentication device is subsequently disconnected from a power supply the authentication bit set in the volatile memory is reset to indicate at a subsequent boot that the authentication device has not been authenticated.

* * * * *